Patented Mar. 21, 1939

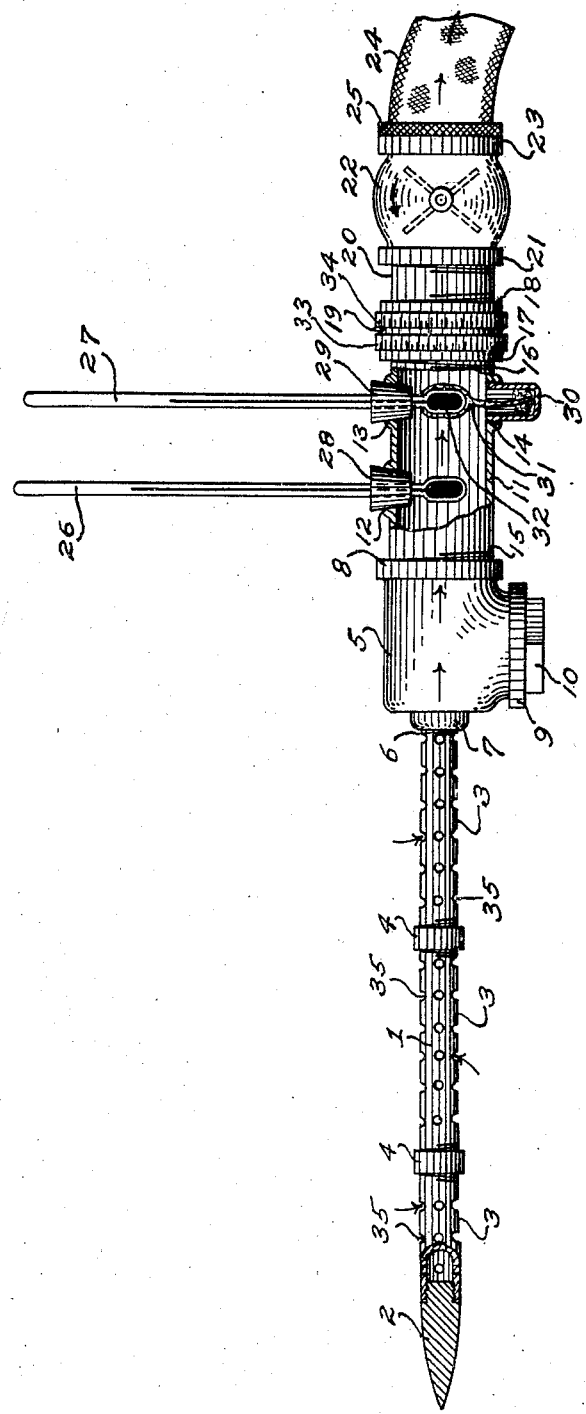

2,151,404

UNITED STATES PATENT OFFICE 2,151,404

APPARATUS FOR DETERMINING THE MOISTURE CONTENT OF AIR PERVADING FIBROUS MATERIAL

George E. Gaus, Washington, D. C., and Charles A. Bennett, Stoneville, Miss.; dedicated to the free use of the People of the United States Application March 20, 1937, Serial No. 132,100

1 Claim. (Cl. 73—338)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to us of any royalty thereon.

We hereby dedicate the invention herein described to the free use of the People of the United States, to take effect upon the granting of a patent to us.

Our invention consists of an improved moisture determination device to be used for bulk fibrous hygroscopic materials, such as seed cotton, whereby the air pervading the fibrous material and in equilibrium moisture content therewith is entrained and vented within the device and its hygrometric condition observed; and by a system of scales and integrating means relating the relative humidity of the entrained air to the water content of the fibrous material, the moisture content of the fibrous material may be directly indicated.

The object of our invention is to provide a device, simple in operation, employing a method of measuring the moisture content of fibrous hygroscopic materials which is less time consuming than the laboratory method of sampling, weighing, drying and reweighing the fibrous hygroscopic material customarily employed in the determination of moisture content through loss of weight.

A further object of our invention is to accelerate the reaction of the water vapor sensitive recording elements, as used in our device, by conducting the air under test past the elements at a moderate velocity, thereby reducing the time-lag in reaction ordinarily encountered when the elements are exposed to air confined in a substantially static state.

A still further object of our invention is to provide a device, portable in character, comprising separably connected units which may be interconnected in various combinations by flexible connecting means, thereby furnishing the convenience of portableness and fixity of related parts in one apparatus.

In order to carry out the purposes of our invention, reference is to be had to the peculiar combination and arrangement of parts as shown in the accompanying drawing, being a preferred embodiment of our invention and forming a part of this specification, in which the parts of our invention are specifically referred to by numerals.

Referring to the drawing it will be seen that the fibrous material entering member 1, adjustable as to length, is provided with a solid penetrating head 2 and a plurality of perforated tubular sections 3 interconnected by means of detachable couplings 4, and is detachably connected at its posterior end 6 to inlet 7 of T-shaped coupling 5. Outlet 9 of T-shaped coupling 5 is sealed by means of removable plug 10. Chamber 11, provided with outlets 12, 13, and 14, is detachably connected at its anterior end 15 to outlet 8 of T-shaped coupling 5 and also detachably connected at its posterior end 16 to inlet 17 of the tubular mount 19. Outlet 18 of tubular mount 19 is detachably connected to inlet 21 of aspirator 22 by tubular means 20. Outlet 23 of aspirator 22 is detachably connected to flexible tubing 24 by means of coupling 25.

Chamber 11 is also provided with thermometers 26 and 27 suspended therein by means of removable perforated air-tight stoppers 28 and 29 inserted in outlets 12 and 13, respectively, and a water-reservoir 30 detachably connected to outlet 14. Said reservoir 30 is provided with a moisture absorbent wick 31 extending therefrom and encasing the bulb 32 of thermometer 27. Thermometer 26 will be hereinafter referred to as the dry bulb thermometer 26, and thermometer 27 as the wet bulb thermometer 27.

Tubular mount 19 is provided with integrating means 33—34 comprising a stationary cylindrical scale 33 indicating degrees of temperature and in juxtaposition thereto a movable cylindrical scale 34 indicating moisture content in terms of percentage of the fibrous material under test.

It is understood that by the manner in which the several units of our device are joined they may be connected by tubings of any suitable material having coupling means, thereby making these elements extensible from each other. Tubings 24 may be used to interconnect either outlet 8, or outlet 9 of T-shaped coupling 5 to the anterior end 15 of chamber 11; and/or posterior end 16 of chamber 11 to inlet 17 of the tubular mount 19; and/or outlet 18 of tubular mount 19 to inlet 21 of aspirator 22.

Having the units of our device interconnected in the order described and the wick 31 encasing bulb 32 of thermometer 27 supplied with moisture, our invention may be practiced by inserting fibrous material entering member 1, previously adjusted to requisite length by interconnecting a proper number of perforated tubular sections 3 between the penetrating head 2 and the inlet 7 of T-shaped coupling 5, full length within the mass of hygroscopic fibrous material of which the moisture content is to be determined. Aspirator 22 is then set in operation, thereby creating a suction within the assembled units of the device, causing the air residing in said fibrous material, and in equilibrium moisture content therewith, to enter tubular sections 3 by means of perforations 35 and to pass through T-shaped coupling 5 into the chamber 11 and to flow past the dry and wet bulb thermometers 26 and 27, respectively, and to pass through tubular mount 19 and through tubular means 20 into aspirator 22, and to be exhausted therefrom through outlet 23 of aspirator 22, as indicated by the directional arrows in the drawing.

The principle of the method for determining moisture content involved in the practice of our invention resides in the well known property possessed by a hygroscopic material, and in particular by textile fibers, of losing moisture to, or gaining moisture from the surrounding atmosphere until a state of definite equilibrium moisture content between the hygroscopic material and its surrounding atmosphere is attained. This effect may be plotted and a smooth curve developed giving the relation between the moisture content of a given specimen of hygroscopic material and the relative humidity of the atmosphere surrounding the specimen.

For the purpose of calibration of the integrating means 33—34, the movable cylindrical scale 34 is indexed in graduations representing, in terms of percent, the equilibrium moisture content values of the fibrous material corresponding to any particular relative humidity. The stationary cylindrical scale 33 is indexed in variably spaced graduations representing degrees of temperature common to both the dry bulb thermometer 26 and the wet bulb thermometer 27; and these graduations are so correlated to the graduations on the movable scale 34, that when the graduation of maximum moisture content on the movable scale 34 is made to register with any dry bulb temperature graduation on the stationary scale 33, then any wet bulb temperature reading on the same scale, when used as a pointer, shall properly indicate on said movable scale 34, the moisture content of the fibrous material under test.

Returning to the practice of our invention, the effects of the hygrometric condition of the air passing through the chamber 11, on hygrometer thermometers 26 and 27 are observed. The maximum temperature of depression of the wet bulb thermometer 27 and the then existing temperature of the entrained air indicated by means of the dry bulb thermometer 26 is noted. The moisture content of the hydroscopic fibrous material under test may be determined from the dry bulb thermometer 26 and the wet bulb thermometer 27 readings, by manipulating the integrating means 33—34 in the following manner. The graduation indicative of maximum moisture percentage on the movable scale 34 is made to register with the temperature graduation on stationary scale 33, corresponding to the prevailing temperature as indicated by the dry bulb thermometer 26, and the temperature graduation on the stationary scale 33 corresponding to the temperature of depression indicated by the wet bulb thermometer 27, is used as a pointer to indicate on the movable scale 34, the prevailing moisture content of the hygroscopic fibrous material under test.

We are aware other types of aspirators and hygrometer or psychrometer means may be employed in our device, namely air-pumps, vacuum or blower fans, and hygroscopic filament type hygrometers or electro wet and dry thermocouples, and we do not wish to be restricted in these means to the types illustrated in the drawing.

Having thus described our invention, what we claim for Letters Patent is:

An apparatus for determining the moisture content of vapors confined at substantially static pressure within bulk fibrous material, comprising an acuminated tubular perforated member adapted to penetrate fibrous material and adapted to tap and to conduct confined vapors exteriorly thereof, a chamber connected to the open end of said tubular member, a dry bulb thermometer and a wet bulb thermometer removably housed in said chamber, said dry bulb thermometer located adjacent to the open end of the tubular member and said wet bulb thermometer positioned in line with said dry bulb thermometer, an aspirator means connected to said chamber oppositely to said tubular member whereby said vapors to be tested may be continuously induced within said tubular member and passed beyond said dry bulb and wet bulb thermometers respectively.

GEORGE E. GAUS.
CHARLES A. BENNETT.